United States Patent
Amari et al.

(10) Patent No.: US 10,913,367 B2
(45) Date of Patent: Feb. 9, 2021

(54) CHARGE AND DISCHARGE MANAGEMENT DEVICE

(71) Applicant: HONDA MOTOR CO., LTD., Tokyo (JP)

(72) Inventors: Yusaku Amari, Saitama (JP); Shinichi Yokoyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 421 days.

(21) Appl. No.: 16/106,592

(22) Filed: Aug. 21, 2018

(65) Prior Publication Data
US 2019/0061552 A1    Feb. 28, 2019

(30) Foreign Application Priority Data

Aug. 24, 2017   (JP) .................................. 2017-161375

(51) Int. Cl.
*B60L 53/10* (2019.01)
*H02J 3/32* (2006.01)
(Continued)

(52) U.S. Cl.
CPC .............. *B60L 53/10* (2019.02); *B60L 53/14* (2019.02); *B60L 53/665* (2019.02); *B60L 55/00* (2019.02);
(Continued)

(58) Field of Classification Search
CPC ........ B60L 53/10; B60L 53/14; B60L 53/665; B60L 53/66; B60L 53/60; B60L 55/00;
(Continued)

(56) References Cited

U.S. PATENT DOCUMENTS

2010/0076825 A1   3/2010   Sato et al.
2012/0133337 A1   5/2012   Rombouts et al.
(Continued)

FOREIGN PATENT DOCUMENTS

JP   2007-323999 A   12/2007
JP   2008-042985 A   2/2008
(Continued)

OTHER PUBLICATIONS

Jul. 23, 2019, German Office Action issued for related DE Application No. 102018214196.7.
(Continued)

*Primary Examiner* — Richard Isla
*Assistant Examiner* — Manuel Hernandez
(74) *Attorney, Agent, or Firm* — Paratas Law Group, PLLC

(57) ABSTRACT

Provided is a charge and discharge management device for managing charging and discharging of an energy storage device in a vehicle, the vehicle including: the energy storage device configured to perform electric power transfer with an external power grid; and an electric device configured to adjust an electric power to be charged and discharged by the energy storage device, and configured to travel by power supply from the energy storage device, wherein the charge and discharge management device is configured to charge the energy storage device, by the electric power transfer with the external power grid, for increasing a remaining capacity of the energy storage device to a predetermined level when a conduction integration time of the electric device measured from a start point of a warranty period of the vehicle is equal to or longer than a first predetermined time.

10 Claims, 12 Drawing Sheets

(51) Int. Cl.
  *B60L 55/00* (2019.01)
  *B60L 53/14* (2019.01)
  *B60L 53/66* (2019.01)
  *H02J 7/00* (2006.01)
  *H02J 3/14* (2006.01)
  *B60L 53/60* (2019.01)

(52) U.S. Cl.
  CPC ............... *H02J 3/32* (2013.01); *H02J 3/322* (2020.01); *H02J 7/0027* (2013.01); *B60L 53/60* (2019.02); *B60L 53/66* (2019.02); *H02J 3/14* (2013.01); *H02J 7/007188* (2020.01)

(58) Field of Classification Search
  CPC ...... H02J 3/322; H02J 3/32; H02J 3/14; H02J 7/0027; H02J 7/007188
  USPC .................................................. 320/134, 128
  See application file for complete search history.

(56) References Cited

U.S. PATENT DOCUMENTS

| | | | | |
|---|---|---|---|---|
| 2013/0249276 | A1* | 9/2013 | Rovik | B60L 3/12 |
| | | | | 307/9.1 |
| 2015/0256003 | A1 | 9/2015 | Yonetani | |
| 2016/0075247 | A1* | 3/2016 | Uyeki | B60L 58/10 |
| | | | | 455/456.3 |
| 2016/0178678 | A1* | 6/2016 | Pelletier | H02J 3/386 |
| | | | | 705/39 |
| 2018/0123357 | A1* | 5/2018 | Beaston | H02J 7/0019 |
| 2018/0210036 | A1 | 7/2018 | Yamauchi et al. | |
| 2018/0300697 | A1* | 10/2018 | Han | G06Q 20/14 |
| 2018/0358663 | A1* | 12/2018 | Yonemoto | H01M 10/48 |
| 2019/0137956 | A1* | 5/2019 | Hooshmand | H02J 7/34 |
| 2020/0353839 | A1* | 11/2020 | Tarchinski | B60L 55/00 |

FOREIGN PATENT DOCUMENTS

| | | |
|---|---|---|
| JP | 2011-050240 A | 3/2011 |
| JP | 2013-198192 A | 9/2013 |
| JP | 2015-027164 A | 2/2015 |
| WO | WO 2017/043239 A1 | 3/2017 |

OTHER PUBLICATIONS

Fluhr et al., Li-Mobility: Batterieforschung und Geschäftsmodellentwicklung für Elektromobilität, Unternehmen der Zukunft, Zeitschrift fur Betriebsorganisation und Unternehmensentwicklung, Mar. 2010, pp. 39-40.

Peterson et al., Lithium-Ion Battery Cell Degradation Resulting from Realistic Vehicle and Vehicle-to-Grid Utilization, Carnegie Mellon Electricity Industry Center Working Paper CEIC-09-02, Aug. 2009, pp. 1-37.

Jul. 23, 2019, German Search Report issued for related DE Application No. 102018214196.7.

\* cited by examiner

CHARGE AND DISCHARGE MANAGEMENT DEVICE

CROSS-REFERENCE TO RELATED APPLICATION

The present application claims the benefit of priority of Japanese Patent Application No. 2017-161375, filed on Aug. 24, 2017, the content of which is incorporated herein by reference.

BACKGROUND

1. Field of the Invention

The present invention relates to a charge and discharge management device for managing charging and discharging of an energy storage device in a vehicle including the energy storage device capable of transferring an electric power with an external power grid and an electric device for adjusting an electric power to be charged and discharged by the energy storage device, and capable of traveling by the power supply from the energy storage device.

2. Description of the Related Art

A Vehicle to Grid (V2G) is one of the business models for realizing a smart grid and it is a system which exchanges an electric power between an electric power system including a commercial power grid and an electric vehicle. In the V2G, when an electric vehicle is not used as a transporting means, an energy storage device mounted in the electric vehicle is used as if it is one of electric power storage facilities in a commercial power grid. Therefore, bidirectional electric power transfer is performed between the electric vehicle participating in the V2G and the electric power system. The electric vehicle participating in the V2G performs continuous discharge for the purpose of maintaining a supply and demand balance in the electric power system or charge and discharge for the purpose of stabilizing a frequency in the electric power system.

The electric power obtained by the continuous discharge of the electric vehicle for the purpose of maintaining the supply and demand balance is used as a "spinning reserve" of the electric power system. Also, the electric power transferred by charging and discharging of the electric vehicles for the purpose of stabilizing the frequency is used for "frequency regulation" of the electric power system. In either case, it is contributed to allow the electric vehicle to stabilize the electric power system. An owner of the electric vehicle can get incentives such as money as compensation for participating in the V2G.

As a technique related to the V2G described above, JP-A-2011-50240 discloses a charge and discharge control device in which a charge and discharge plan is created and implemented based on a past charging and discharging amount and past incentives in an electric vehicle, so that travelling is optimized to complete the charging with a required amount by a required time, and the relationship between expense paid by charging behavior and income obtained by discharging behavior is optimized.

In the technique described in JP-A-2011-50240 described above, a charge and discharge plan is created based on past information, but no consideration is given to the durability of electric devices such as an inverter constituting a charge and discharge mechanism mounted on an electric vehicle. Therefore, when charging and discharging by the V2G is performed without limitation according to the charge and discharge plan, if a load on the electric device of the electric vehicle is excessive due to the V2G, there may be troubles in travelling, which is the original purpose of use of the electric vehicle.

SUMMARY

An object of the invention is to provide a charge and discharge management device capable of transferring an electric power between a vehicle and an external power grid depending on the situation while giving priority to travelling of the vehicle.

According to a first aspect of the invention, there is provided a charge and discharge management device for managing charging and discharging of an energy storage device in a vehicle, the vehicle including: the energy storage device configured to perform electric power transfer with an external power grid; and an electric device configured to adjust an electric power to be charged and discharged by the energy storage device, and configured to travel by power supply from the energy storage device, wherein the charge and discharge management device is configured to charge the energy storage device, by the electric power transfer with the external power grid, for increasing a remaining capacity of the energy storage device to a predetermined level when a conduction integration time of the electric device measured from a start point of a warranty period of the vehicle is equal to or longer than a first predetermined time.

According to a second aspect of the invention, in the charge and discharge management device according to the first aspect, when a conduction integration time of the electric device in a predetermined unit period is equal to or longer than a second predetermined time, the charge and discharge management device restricts the vehicle from participation in a system corresponding to the electric power transfer with the external power grid in response to an external request.

According to a third aspect of the invention, in the charge and discharge management device according to the first aspect or the second aspect, a conduction integration time of the electric device is a value of adding a conduction time of the electric device during travelling of the vehicle, a conduction time of the electric device at the time of charging the energy storage device to raise a remaining capacity of the energy storage device to the predetermined level, and a conduction time of the electric device when the energy storage device is charged and discharged to and from the power grid in response to an external request.

According to a fourth aspect of the invention, in the charge and discharge management device according to the third aspect, the charge and discharge management device calculates a difference between a conduction integration time of the electric device in the predetermined unit period and the second predetermined time, and modifies the second predetermined time based on the difference.

According to a fifth aspect of the invention, in the charge and discharge management device according to the fourth aspect, the second predetermined time is an upper limit value of a conduction time of the electric device in the predetermined unit period based on the first predetermined time, and when a conduction integration time of the electric device in the predetermined unit period is shorter than the second predetermined time, the charge and discharge management device sets a value obtained by adding a value based on the difference to the upper limit value as the second predetermined time.

According to a sixth aspect of the invention, in the charge and discharge management device according to the fourth aspect, the second predetermined time is an upper limit value of a conduction time of the electric device in the predetermined unit period based on the first predetermined time, and when a conduction integration time of the electric device in the predetermined unit period is longer than the second predetermined time, the charge and discharge management device sets a value obtained by subtracting a value based on the difference from the upper limit value as the second predetermined time.

According to a seventh aspect of the invention, in the charge and discharge management device according to any one of the first to sixth aspects, the vehicle participates in a system corresponding to the electric power transfer with the external power grid in response to an external request.

According to an eighth aspect of the invention, in the charge and discharge management device according to any one of the first to seventh aspects, when a conduction integration time of the electric device in the predetermined unit period is shorter than the second predetermined time, the charge and discharge management device sends a notification of urging decision, on whether the vehicle participates in a system corresponding to the electric power transfer with the external power grid, to a mobile communication terminal possessed by an administrator of the vehicle.

According to a ninth aspect of the invention, in the charge and discharge management device according to any one of the first to eighth aspects, the charge and discharge management device is provided in a server device controlling charging and discharging of the energy storage device of the vehicle according to an electric power request from an electric power system.

According to a tenth aspect of the invention, in the charge and discharge management device according to any one of the first to eighth aspects, the charge and discharge management device is provided in the vehicle.

According to the first aspect, when the conduction integration time of the electric device of the vehicle which is measured from a start point of the warranty period of the vehicle is equal to or longer than the first predetermined time, only charging for increasing the remaining capacity of the energy storage device to the predetermined level required for travelling of the vehicle is performed in between charging and discharging of the energy storage device by electric power transfer with the external power grid. After the conduction integration time measured from the start point of the warranty period exceeds the first predetermined time, travelling of the vehicle can be performed by performing only charging of the energy storage device without performing electric power transfer between the vehicle and the power grid in a state where the durability of the electric device is degraded.

According to the second aspect, when the conduction integration time of the electric device for a predetermined unit period such as one year, one month, one week, one day, or the like, is equal to or longer than the second predetermined time, participation in the electric power transfer with the power grid is restricted in response to the external request. The second predetermined time which is to be compared with the conduction integration time of the electric device in a predetermined unit period is sot based on the durability of the electric device and, when the conduction integration time is frequently equal to or longer than the second predetermined time, a timing at which the electric device cannot be used becomes earlier. When the electric device cannot be used, the electric vehicle cannot run. Therefore, when the conduction integration time in a predetermined unit period is equal to or longer than the second predetermined time, by performing charging of the energy storage device for travelling, it is possible to reliably carry out travelling as the intended original purpose of the vehicle. When the conduction integration time does not exceed the second predetermined time, charging and discharging of the energy storage device including the electric power transfer performed with the external power grid can be performed without restriction. Therefore, it is possible to transfer the electric power between the vehicle and the external power grid in accordance with the situation while giving priority to travelling of the electric vehicle.

According to the third aspect, since the value obtained by adding the conduction time during travelling, the conduction time at the time of charging the energy storage device, and the conduction time at the time of charging and discharging in response to the external request is set to the conduction integration time of the electric device, the conduction integration time which is to be compared with the first predetermined time or the second predetermined time can be accurately obtained.

According to the fourth aspect, the second predetermined time can be set according to the change of the situation in each predetermined unit period by modifying the second predetermined time based on a difference between the conduction integration time of the predetermined unit period and the second predetermined time.

According to the fifth aspect, when the conduction integration time of the predetermined unit period is shorter than the second predetermined time, it is possible to approximate the average value of conduction time over a plurality of predetermined unit periods to the initial second predetermined time by setting a value obtained by adding a value based on the difference between the conduction integration time and the second predetermined time and an upper limit value of the conduction time in a predetermined unit period to the second predetermined time.

According to the sixth aspect, when the conduction integration time of the predetermined unit period is longer than the second predetermined time, it is possible to approximate an average value of the conduction time over a plurality of predetermined unit periods to the initial second predetermined time by setting a value obtained by subtracting a value based on the difference between the conduction integration time and the second predetermined time from an upper limit value of the conduction time in a predetermined unit period to the second predetermined time.

According to the seventh aspect, whether or not the energy storage device participates in the electric power transfer with the power grid in response to an external request is determined by the intention of an administrator of the vehicle, so that the administrator can select the usability of the vehicle.

According to the eighth aspect, since a notification of urging decision to participate or not in electric power transfer with the power grid in response to an external request is sent to the mobile communication terminal, it is possible to select participation in the electric power transfer of the vehicle according to the intention of an administrator.

According to the ninth aspect, the server device collectively manages charging and discharging management of the energy storage device based on the conduction time of the electric device of the vehicle, and thus the entire system including the vehicle and the server device can be operated efficiently.

According to the tenth aspect, each vehicle performs charging and discharging management of the energy storage device based on the conduction time of the electric device of the vehicle, so that the processes in a case where there are a plurality of vehicles can be distributedly performed.

BRIEF DESCRIPTION OF THE DRAWINGS

The present invention will become more fully understood from the detailed description given hereinbelow and the accompanying drawing which is given by way of illustration only, and thus is not imitative of the present invention and wherein.

DETAILED DESCRIPTION OF INVENTION

Hereinafter, embodiments of the invention will be described with reference to the drawings.

First Embodiment

A Vehicle to Grid (V2G) system is a system that exchanges electric power between an electric power system including a commercial power grid and an electric vehicle and, when the electric vehicle is not used as moving means, an energy storage device mounted on the electric vehicle is used as an electric power storage facility. Therefore, an electric power is bidirectionally transferred between the electric vehicle participating in the V2G and the electric power system.

An electric vehicle participating in the V2G performs continuous discharging for the purpose of maintaining supply and demand balance in the electric power system or charging and discharging for the purpose of stabilizing a frequency in the electric power system according to the situation of the electric power system. An electric power obtained by continuous discharging of the electric vehicle for the purpose of maintaining supply and demand balance is used as a "Spinning Reserve" of the electric power system. Continuous discharging for the spinning reserve is made especially for the purpose of supplying an electric power to the electric power system which is required for maintaining supply and demand balance as the electric power demand in the electric power system increases. In addition, the electric power transferred by charging and discharging of the electric vehicle for the purpose of stabilizing the frequency is used for the "frequency regulation" of the electric power system. In both cases, the electric vehicle contributes to the stabilization of the electric power system.

Configuration of V2G System

Figure 1:
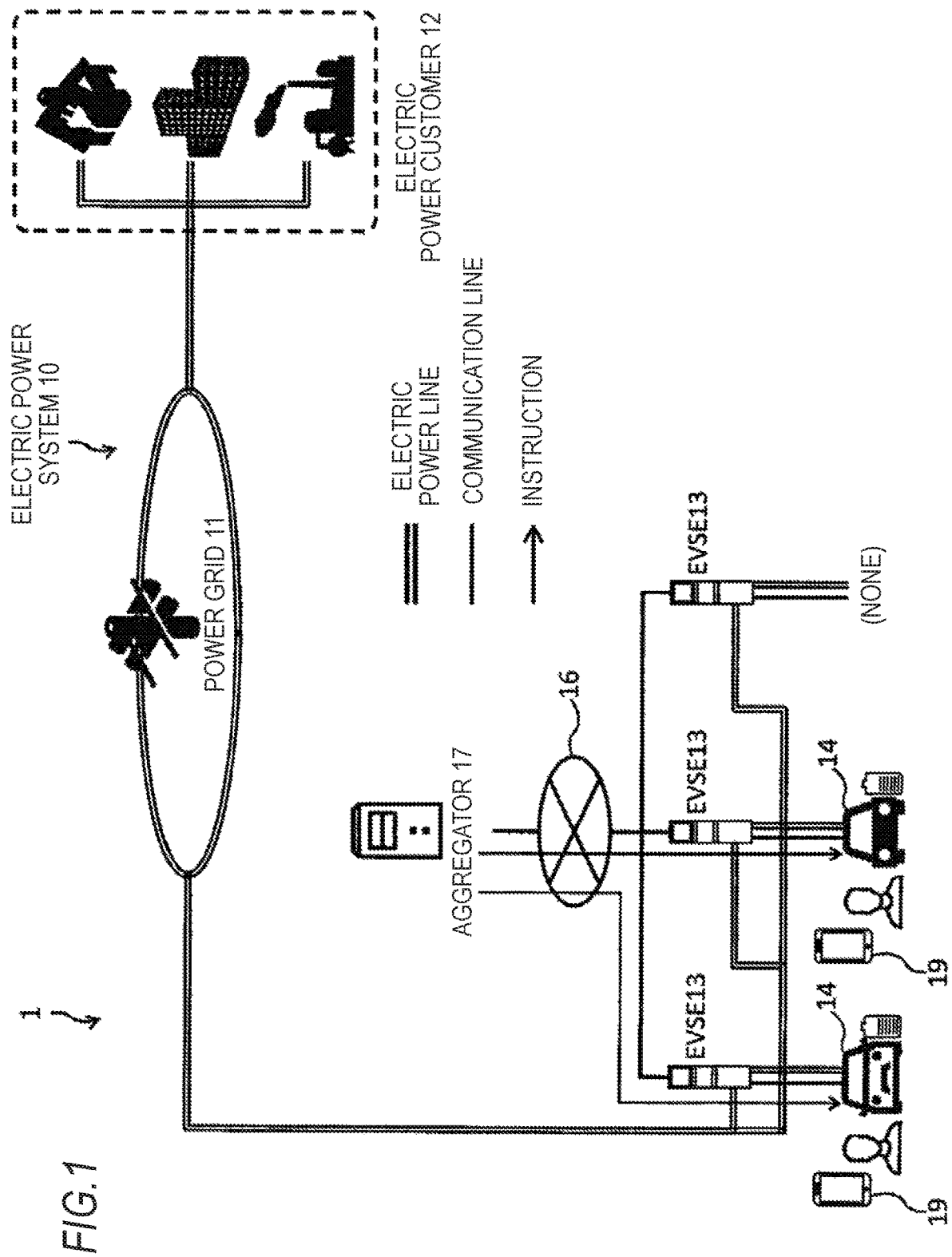
FIG. 1 is a diagram illustrating an overall configuration of a V2G system.

FIG. 1 is a diagram illustrating an overall configuration of a V2G system 1. As illustrated in FIG. 1, the V2G system 1 includes a power grid 11 for transmitting an electric power generated by a power plant or the like which generates an electric power with energy such as thermal power, wind power, nuclear power, or sunlight, an electric power system 10 including an electric power customer 12 receiving power supply, an Electric Vehicle Service Equipment (EVSE) 13 which is an external power source resource connected to the power grid 11 via an electric power distribution facility (not illustrated), an electric vehicle 14 such as an Electrical Vehicle (EV) or a Plug-in Hybrid Electric Vehicle (PHEV) equipped with a chargeable/dischargeable energy storage device, a communication network 16, and an aggregator 17 which manages charging and discharging of the energy storage device of the electric vehicle 14 via the EVSE 13 connected to the communication network 16. In the example shown in FIG. 1, the aggregator 17 manages the three electric vehicles 14 respectively connected to the three EVSEs 13.

The EVSE 13 and the aggregator 17 are connected via a wired or wireless communication network, and thus it is possible to transmit and receive requirement relating to charging and discharging of each energy storage device of the electric vehicle 14 and information on the state of each energy storage device between the electric vehicle 14 connected to the EVSE 13 and the aggregator 17.

Figure 2:
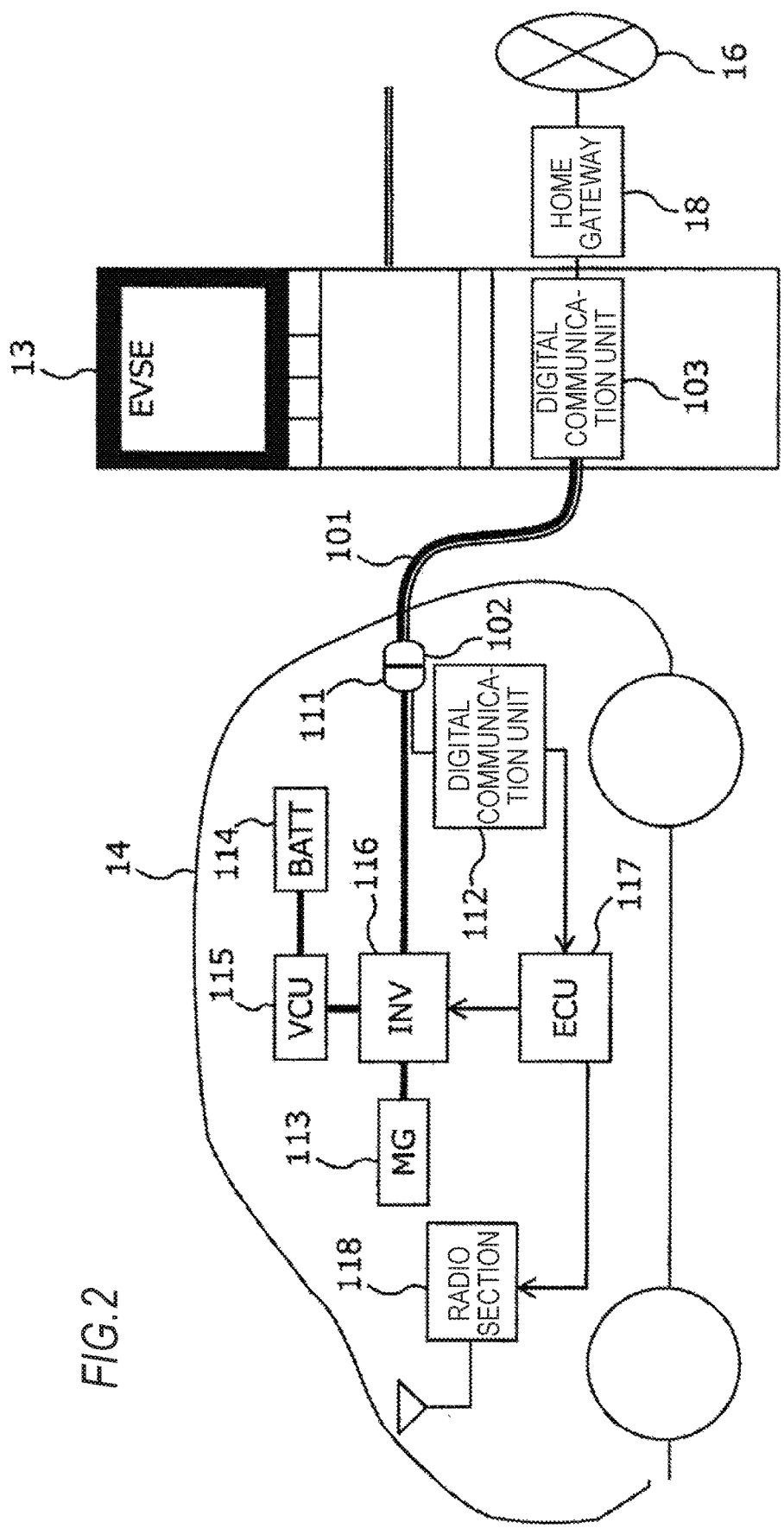
FIG. 2 is a block diagram illustrating an internal configuration of an EVSE and an electric vehicle which constitute a part of the V2G system illustrated in FIG. 1.

FIG. 2 is a block diagram illustrating, the EVSE 13 and the electric vehicle 14 constituting a part of the V2G system 1 illustrated in FIG. 1. As illustrated in FIG. 2, the EVSE 13 includes a cable 101, a connector 102 provided at the tip of the cable 101, and a digital communication unit 103. The electric vehicle 14 includes an inlet 111, a digital communication unit 112, a motor generator (MG) 113, a chargeable/dischargeable energy storage device (BATT) 114, a VCU 115, an inverter 116, an Electronic Control Unit (ECU) 117, and a radio section 115.

Next, each component of the EVSE 13 will be described.

The connector 102 transfers an electric power between the EVSE 13 and the electric vehicle 14 in a state where the connector 102 is connected to the inlet 111 of the electric vehicle 14. The digital communication unit 103 is connected to the communication network 16 via a home gateway 18 and superimposes a signal obtained from the aggregator 17 on the electricity exchanged between the EVSE 13 and the electric vehicle 14 by using Power Line Communication (PLC) technology. Therefore, when the connector 102 is connected to the inlet 111 of the electric vehicle 14, a signal from the aggregator 17 is sent to the electric vehicle 14 and a signal from the electric vehicle 14 is sent to the aggregator 17.

Next, each component of the electric vehicle 14 will be described.

The connector 102 of the EVSE 13 is detachable with respect to the inlet 111. The digital communication unit 112 receives the signal superimposed on the electricity from the EVSE 13 by the power line communication technology in a state where the connector 102 of the EVSE 13 is attached to the inlet 111. Further, the connection form between the electric vehicle 14 and the EVSE 13 is not limited to the physical connection by the inlet 111 and the connector 102 but may be an electromagnetic connection such as a non-contact charge and discharge in a state where the inlet 111 and the connector 102 are located to be close to each other. In any case, when the inlet 111 and the connector 102 are electromagnetically connected, the digital communication unit 112 can receive a signal from the EVSE 13 using the power line communication technology and can also transmit a signal to the EVSE 13.

The motor generator 113 generates power for the electric vehicle 14 to travel.

The energy storage device 114 includes a plurality of storage cells such as lithium ion batteries, nickel hydrogen batteries, and the like. In a state where the electric vehicle 14 is not connected to the EVSE 13, the energy storage device 114 supplies an electric power to the motor generator 113, which is the driving source of the electric vehicle 14, and other devices (not illustrated) which need electricity. Furthermore, in a state where the electric vehicle 14 is connected to the EVSE 13, the energy storage device 114 performs charging and discharging according to the request from the aggregator 17 or charging for raising a State Of Charge (SOC: also referred to as a remaining capacity), which is a variable representing the state of charge of the energy storage device 114 by a percentage, to a preset level. When the SOC is 100%, the energy storage device 114 is in a fully charged state.

The VCU 115 boosts the output voltage of the energy storage device 114. In addition, the VCU 115 steps down the power obtained from the power grid 11 via the EVSE 13. The power stepped down by the VCU 115 is charged in the energy storage device 114.

The inverter 116 converts a DC voltage discharged from the energy storage device 114 and boosted by the VCU 115 into an AC voltage. The electric power converted into the AC voltage by the inverter 116 is sent to the motor generator 113 when the electric vehicle 14 travels and sent to the outside of the electric vehicle 14 via the inlet 111 when the electric vehicle 14 participates in the V2G. In addition, the inverter 116 converts the AC voltage obtained from the power grid 11 via the EVSE 13 to a DC voltage. The power converted into the DC voltage by the inverter 116 is stepped down by the VCU 115 and then the power is charged in the energy storage device 114.

Based on the voltage and the input/output current of the energy storage device 114 detected by a voltage sensor and a current sensor (not illustrated), the ECU 117 derives the SOC of the energy storage device 114 by a current integration method or an open circuit voltage (OCV) estimation method. Further, the ECU 117 controls an operation of the inverter 116 in response to a request indicated by a signal from the aggregator 17 received by the digital communication unit 112. The request sent by the aggregator 17 to the electric vehicle 14 participating in the V2G is a request related to the transfer of electric power between the electric vehicle 14 and the power grid 11 and varies depending on an electric power quality or electric power supply and demand balance in the power grid 11 and the like. That is, this request is a short-term charge and discharge execution request for performing the frequency regulation of the power grid 11 described above, or a continuous discharge execution request for providing the spinning reserve described above to the power grid 11.

When the electric vehicle 15 is connected to the EVSE 13, the radio section 118 periodically wirelessly transmits information such as the SOC of the energy storage device 125 derived by the ECU 131 and the conduction integration time of a predetermined unit period of an electric device mounted on the electric vehicle 14 to the aggregator 17 via a radio base station (not illustrated) connected to the communication network 16.

Next, each component of the aggregator 17 will be described. The aggregator 17 manages charging and discharging between the power grid 11 and the energy storage device 114 of the electric vehicle 14 in response to a request from an electric power company operating the power plant or an electric power transmission company operating the power grid 11.

Figure 3:
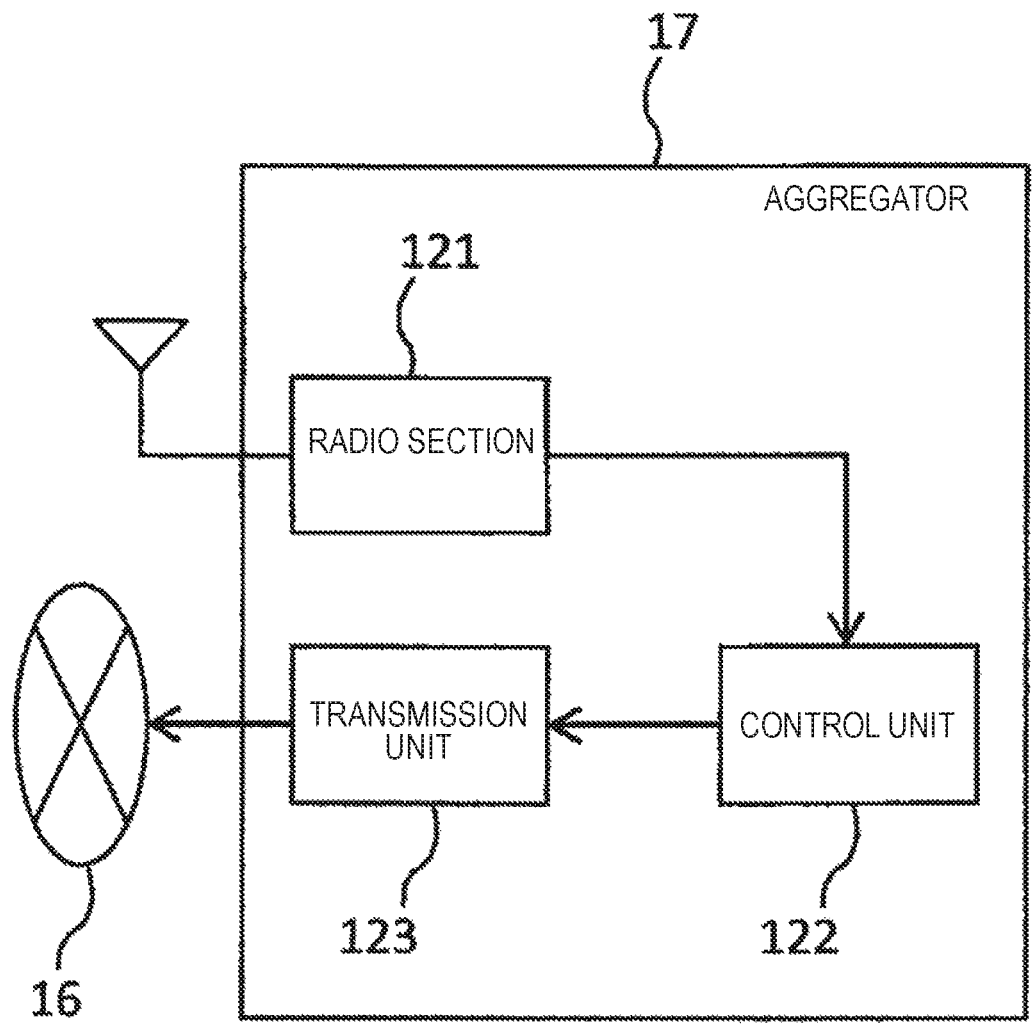
FIG. 3 is a block diagram illustrating an internal configuration of an aggregator which constitutes a part of the V2G system illustrated in FIG. 1.

FIG. 3 is a block diagram illustrating an internal configuration of the aggregator 17. As illustrated in FIG. 3, the aggregator 17 is a server device including a radio section 121, a control unit 122, and a transmission unit 123.

The radio section 121 receives a radio signal transmitted from the radio section 118 of the electric vehicle 14. Further, the radio section 121 communicates with, for example, a mobile communication terminal 19 illustrated in FIG. 1 which an administrator of the electric vehicle 14 has and the radio section 121 receives a radio signal indicating information such as participation intention (participation or non-participation) of the electric vehicle 14 to the V2G set by an operation of the mobile communication terminal 19. Information indicated by the radio signal received by the radio section 121 is sent to the control unit 122. Further, the radio section 121 transmits a message for confirming the intention to participate in the V2G to the mobile communication terminal 19 possessed by the administrator of the electric vehicle 14 which may participate in the V2G. A message sent from the aggregator 17 is displayed in the mobile communication terminal 19 and, when the intention to participate in the V2G is set by the operation of the mobile communication terminal 19, a radio signal indicating the participation intention is transmitted from the mobile communication terminal 19 to the aggregator 17. The administrator of the electric vehicle 14 including the mobile communication terminal 19 may be an owner of the electric vehicle 14 or a person using the electric vehicle 14 by borrowing or the like.

The control unit 122 determines for each electric vehicle connected to the EVSE 13 whether to request short-term charge and discharge switching to the electric vehicle 15 for the frequency regulation of the power grid 11 or to request continuous discharge to the electric vehicle 15 for providing the spinning reserve to the power grid 11, based on a request from an electric power company operating a power plant or an electric power transmission company operating the power grid 11, information from each electric vehicle 14 received by the radio section 121, and information from the mobile communication terminal 19.

The transmission unit 123 transmits a request corresponding to the determined contents of the control unit 122 to the electric vehicle 14 via the communication network 16 and the EVSE 13.

Charging and Discharge Management of Energy Storage Device mounted on Electric Vehicle Next, charging and discharging management of the energy storage device 114 of the electric vehicle 14 which can participate in the V2G will be described. The table shown below illustrates the conduction upper limit time of the VCU 115 and the inverter 116 (hereinafter, simply referred to as an "electric device") which are electric devices required for charging or discharging the energy storage device 114 during a warranty period of the electric vehicle 14, one year, one week, and one day.

TABLE 1

|  | CONDUCTION UPPER LIMIT TIME |
|---|---|
| WARRANTY PERIOD (FOR A YEARS) | Tl |
| 1 YEAR | Tl/A |
| 1 WEEK | Tl/A/52 (=Tlw) |
| 1 DAY | Tl/A/52/7 (=Tld) |

As illustrated in the table shown above, when the warranty period of the electric vehicle 14 is set to A years and the conduction upper limit time of the electric device in the warranty period is set to "Tl", the conduction upper limit time of the electric device for one year is "Tl/A", and the conduction upper limit time of the electric device for one week is "Tl/A/52", and further, the conduction upper limit time of the electric device of one day is "Tl/A/52/7".

In order for the durability of the electric device to satisfy at least the warranty period of electric vehicle 14, it is necessary to control charging and discharging of the energy storage device 114 so that a conduction integration time T of each predetermined unit period (A years, one year, one week, and one day) of the electric device is within the corresponding conduction upper limit time. The conduction integration time T of the electric device is a value obtained by adding a conduction time (travelling conduction time) Ta of the electric device during travelling of the electric vehicle 14 which is performed during a predetermined unit period or during a period from the start of the warranty period of the electric vehicle 14 to the present time, a conduction time (charting conduction time) Tb of the electric device during charging of the energy storage device 114 which is performed to raise the SOC of the energy storage device 114 to a predetermined level (for example, SOC 100%) in a state where the electric vehicle 14 is connected to the EVSE 13, and the conduction time (V2G conduction time) Tc of the electric device during charging or discharging of the energy storage device 114 according to the request from the aggregator 17 in a state where the electric vehicle 14 is connected to the EVSE 13. That is, the relational expression "T=Ta+Tb+Tc" is satisfied. A V2G conduction time Tc is the sum of a conduction time (frequency regulation conduction time) Tf of the electric device during short-term charging and discharging to perform the frequency regulation of the power grid 11 and a conduction time (spinning reserve conduction time) Ts of the electric device during continuous discharging to provide the spinning reserve to the power grid 11. That is, the relational expression "Tc=Tf+Ts" is satisfied.

Figure 4:
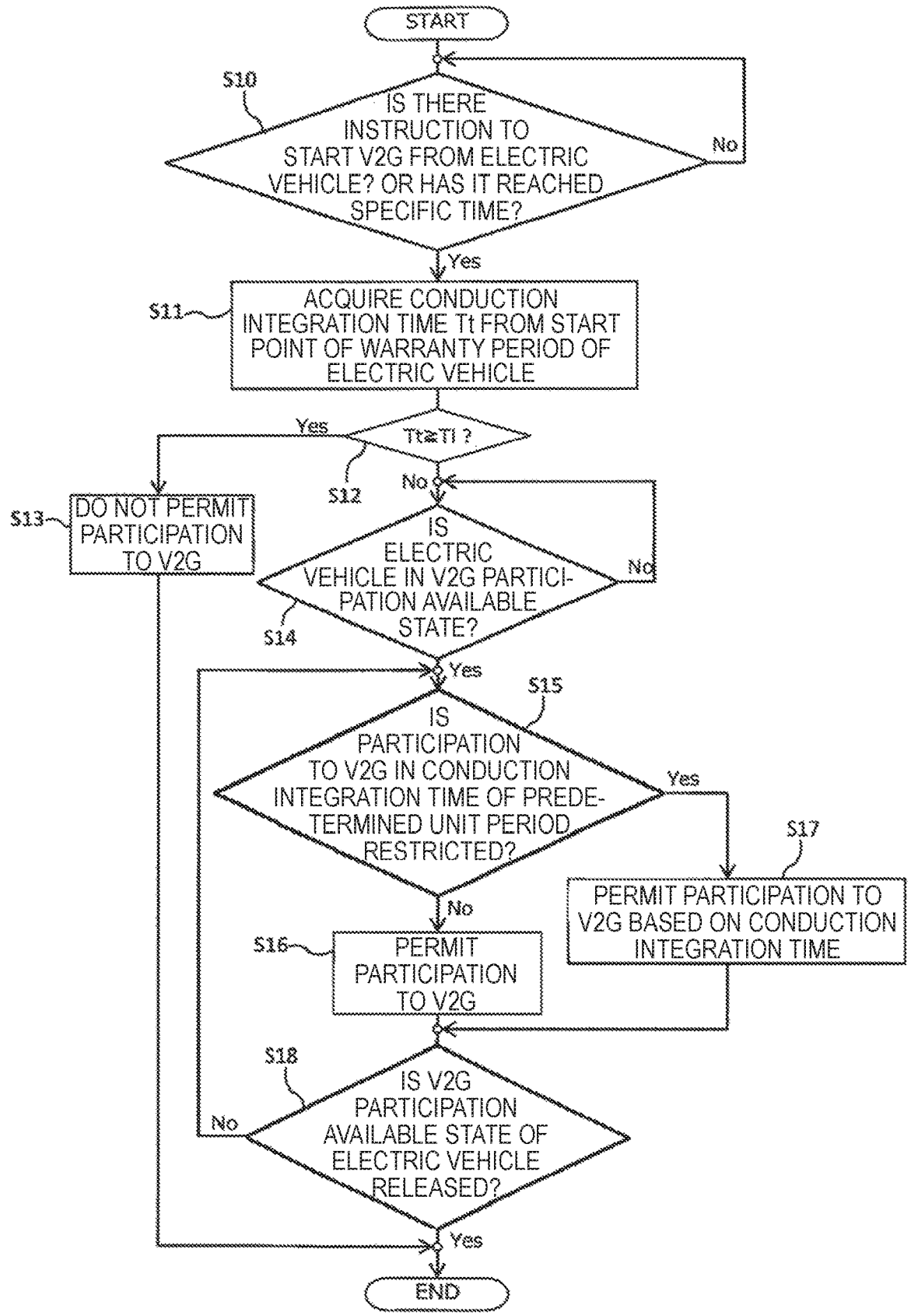
FIG. 4 is a flowchart illustrating a process by the aggregator relating to participation of the electric vehicle in the V2G.

FIG. 4 is a flowchart illustrating a process by the aggregator 17 relating to participation of the electric vehicle 14 in the V2G. As illustrated in FIG. 4, the aggregator 17 determines whether it has acquired an instruction to start participation in the V2G from the electric vehicle 14 or whether it has reached a specific time (for example, 18:00) preset for the electric vehicle 14 and, when the determination is "Yes", the process proceeds to Step S11. In Step S11, the aggregator 17 acquires, from the electric vehicle 14, the conduction integration time Tt of the electric device from the start point of the warranty period of the electric vehicle 14 to the present time. Next, the aggregator 17 determines whether the conduction integration time Tt is equal to or longer than the conduction upper limit time Tl of the electric device of the warranty period (Step S12) and, when Tt≥Tl is satisfied, the process proceeds to Step S13 and, when Tt<Tl is satisfied, the process proceeds to Step S14.

In Step S13, the aggregator 17 does not permit the electric vehicle 14 to participate in the V2G. In Step S14, the aggregator 17 determines whether the electric vehicle 14 is in a state where it is possible to participate in the V2G and, when it is possible to participate, the process proceeds to Step S15. The state in which the electric vehicle 14 is possible to participate in the V2G is a state in which the connector 102 of the EVSE 13 is attached to the inlet 111 of the electric vehicle 14, a state where an ignition switch of the electric vehicle 14 is turned off, and the like. In Step S15, the aggregator 17 determines whether or not to restrict participation of the electric vehicle 14 to the V2G in the conduction integration time of the predetermined unit period and, when it is not restricted, the process proceeds to Step S16 and, when it is restricted, the process proceeds to Step S17.

In Step S16, the aggregator 17 permits the electric vehicle 14 to participate in the V2G based on a request from an electric power company operating a power plant, an electric power transmission company operating the power grid 11, and the like. On the other hand, in Step S17, the aggregator 17 permits the electric vehicle 14 to participate in the V2G based on a request from an electric power company operating a power plant, an electric power transmission company operating the power grid 11, and the like and the conduction integration time of a predetermined unit period of the electric device mounted on electric vehicle 14. The subroutine of Step S17 will be described below. After Step S16 or Step S17, the aggregator 17 determines whether the state in which the electric vehicle 14 is possible to participate in the V2G is released (Step S18) and, when it is not released, the process returns to Step S15 and, when it is released, the series of processes is finished.

Figure 5:
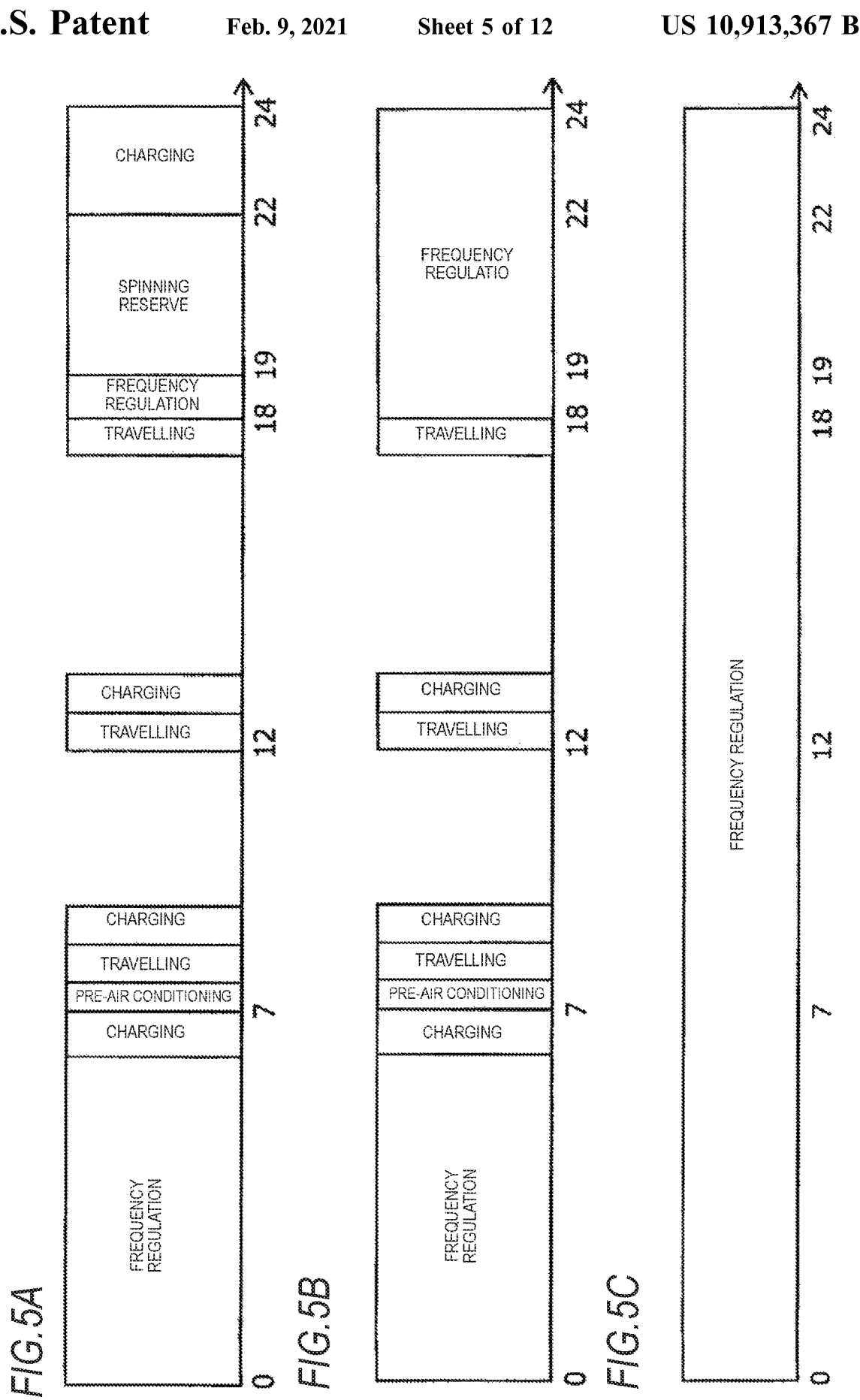
FIGS. 5A to 5C are diagrams illustrating an operation example of the electric vehicle per day when the aggregator does not restrict participation in the V2G in a conduction integration time.

FIGS. 5A to 5C are diagrams illustrating an operation example of the electric vehicle 1 per day when the aggregator 17 does not restrict participation in the V2G in the conduction integration time. In the operation example illustrated in FIG. 5A, currents are applied to the electric device of the electric vehicle 14 for the following operation in the following time zone.

| (TIME ZONE) | (OPERATION) |
|---|---|
| 0:00~6:00 | FREQUENCY REGULATION |
| 6:00~7:00 | CHARGING |
| 7:00~7:15 | PRE-AIR CONDITIONING |
| 7:15~8:00 | TRAVELLING |
| 8:00~8:45 | CHARGING |

-continued

| (TIME ZONE) | (OPERATION) |
|---|---|
| 12:00~13:00 | TRAVELLING |
| 13:00~13:45 | CHARGING |
| 17:00~18:00 | TRAVELLING |
| 18:00~19:00 | FREQUENCY REGULATION |
| 19:00~22:00 | SPINNING RESERVE |
| 22:00~24:00 | CHARGING |

In the operation example illustrated in FIG. 5B, currents are applied to the electric device of the electric vehicle 14 for the following operation in the following time zone.

| (TIME ZONE) | (OPERATION) |
|---|---|
| 0:00~6:00 | FREQUENCY REGULATION |
| 6:00~7:00 | CHARGING |
| 7:00~7:15 | PRE-AIR CONDITIONING |
| 7:15~8:00 | TRAVELLING |
| 8:00~8:45 | CHARGING |
| 12:00~13:00 | TRAVELLING |
| 13:00~13:45 | CHARGING |
| 17:00~18:00 | TRAVELLING |
| 18:00~24:00 | FREQUENCY REGULATION |

In the operation example illustrated in FIG. 5C, currents are applied to the electric device of the electric vehicle 14 for the following operation in the following time zone.

| (TIME ZONE) | (OPERATION) |
|---|---|
| 0:00~24:00 | FREQUENCY REGULATION |

When participation in the V2G is restricted in the conduction integration time, the aggregator 17 manages charging and discharging of the energy storage device 114 mounted on the electric vehicle 14 so that, for each operation example illustrated in FIGS. 5A to 5C, the conduction integration time per day is within the conduction upper limit time (Tld illustrated in the above table) of the electric device per day. Hereinafter, the details of the conduction integration time for each operation example illustrated in FIGS. 5A to 5C in a case where charging and discharging of the energy storage device 114 is managed so that the conduction integration time per day is within the conduction upper limit time Tld per day will be described with reference to FIG. 6.

Figure 6:
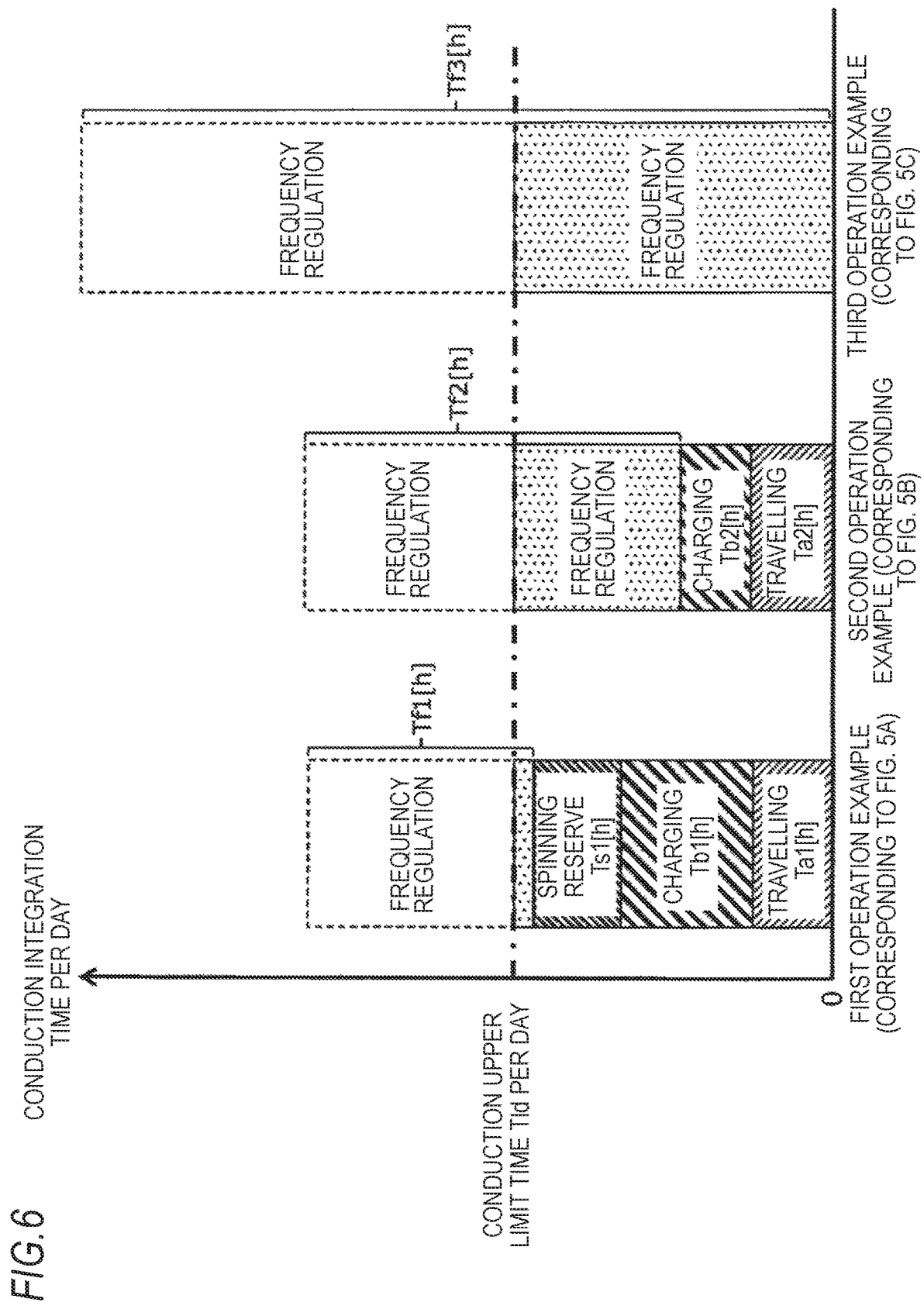
FIG. 6 is a diagram illustrating the conduction integration time for each operation example illustrated in FIGS. 5A to 5C when charging and discharging of an energy storage device is managed so that the conduction integration time per day is within a conduction upper limit time per day.

A first operation example illustrated in FIG. 6 corresponds to the operation example illustrated in FIG. 5A. In this case, when the management described above is not performed, the sum of a travelling conduction time Ta1 including pre-air conditioning, a charging conduction time Tb1, a spinning reserve conduction time Ts1, and a frequency regulation conduction time Tf1 will be the conduction integration time per day. However, the conduction integration time is equal to or longer than the conduction upper limit time Tld per day, and thus the conduction integration time per day is within the conduction upper limit time Tld by eliminating a part of the frequency regulation conduction time Tf1.

A second operation example illustrated in FIG. 6 corresponds to the operation example illustrated in FIG. 5B. In this case, when the management described above is not performed, the sum of a travelling conduction time Tat including pre-air conditioning, a charging conduction time Tb2, and a frequency regulation conduction time Tf2 will be the conduction integration time per day. However, the conduction integration time is equal to or longer than the conduction upper limit time Tld per day, and thus the conduction integration time per day is within the conduction upper limit time Tld by eliminating a part of the frequency regulation conduction time Tf2.

A third operation example illustrated in FIG. 6 corresponds to the operation example illustrated in FIG. 5C. In this case, when the management described above is not performed, a frequency regulation conduction time Tf3 will be the conduction integration time per day. However, the conduction integration time is equal to or longer than the conduction upper limit time Tld per day, and thus the conduction integration time per day is within the conduction upper limit time Tld by adjusting a part of the frequency regulation conduction tune Tf3.

As described above, when the conduction integration time per day of the electric device of the electric vehicle 14 is equal to or longer than the conduction upper t time Tld, the aggregator 17 causes the conduction integration time per day to be within the conduction upper limit time Tld by not performing part of the execution request of the frequency regulation related to the V2G to the electric vehicle 14. Furthermore, as illustrated in a fourth operation example of FIG. 7, when the conduction integration time per day obtained by adding the travelling conduction time Ta4 including the pre-air conditioning and the charging conduction time Tb4 is equal to or longer than the conduction upper limit time Tld, none of execution requests of the frequency regulation and the spinning reserve related to the V2G is performed. Further, as illustrated in a fifth operation example of FIG. 7, when the time obtained by adding the travelling conduction time Ta5 including the pre-air conditioning and the charging conduction time Tb5 is shorter than the conduction upper limit time Tld, the aggregator 17 performs an execution request for spinning reserve even when, if the execution request of the spinning reserve related to the V2G is performed, the conduction integration time per day (=travelling conduction time Ta5+charging conduction time Tb5+spinning reserve conduction time Ts5) exceeds the conduction upper limit time Tld.

Figure 7:
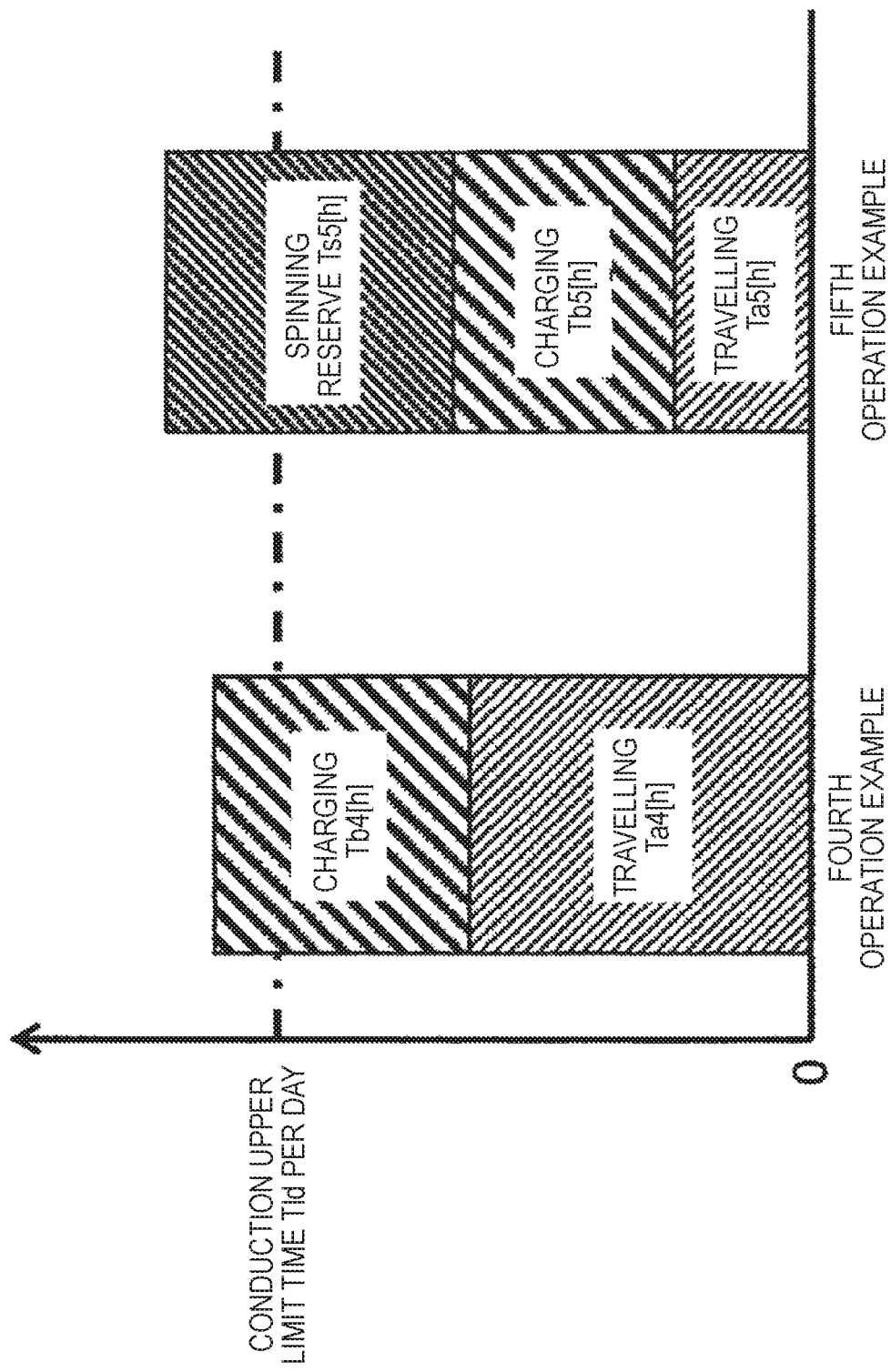
FIG. 7 is a diagram illustrating the conduction integration time for each of other operation examples when charging and discharging of the energy storage device is managed so that the conduction integration time per day is within the conduction upper limit time per day.
Figure 8:
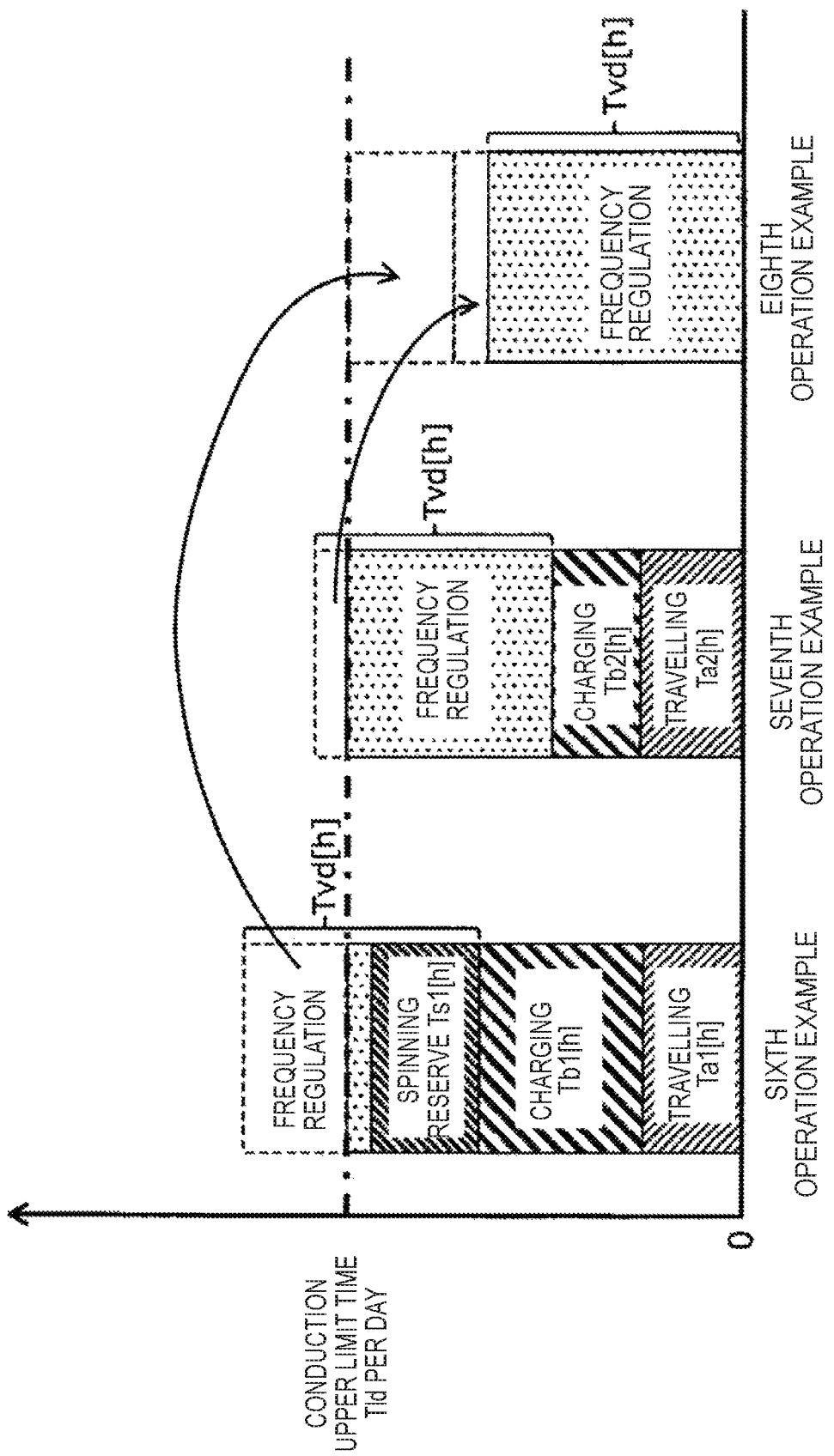
FIG. 8 is a diagram illustrating a case where at least a part of a frequency regulation conduction time restricted because the conduction integration time per day is equal to or longer than the conduction upper limit time per day is allocated on the day without a travelling conduction time and a charging conduction time.

As in the fourth operation example and the fifth operation example illustrated in FIG. 7, when currents are applied to the electric device beyond the conduction upper limit time Tld, the aggregator 17 sets the value obtained by subtracting the time corresponding to the conduction time by the extent of exceeding the conduction upper limit time Tld from the conduction upper it time Tld to the conduction upper limit time of the later day. Further, as illustrated in FIG. 8, when an average value of the time during which the electric vehicle 14 participates in the V2G is a Tvd time, the aggregator 17 assigns at least a part of the frequency regulation conduction time which is restricted because the frequency regulation conduction time is equal to or longer than the conduction upper limit time Tld per day to a day indicated by an eighth operation example in which neither the travelling conduction time Ta nor the charging conduction time Tb is present, in such a manner that the frequency regulation may be performed on that day with the conduction upper limit time Tld as the upper limit.

Next, charging and discharging control of the energy storage device 114 mounted on the electric vehicle 14 by the aggregator 17 in a case of a subroutine of Step S17 illustrated in the flow chart of FIG. 4, that is, a case where the participation of the electric vehicle 14 to the V2G is restricted so that the conduction integration a predetermined unit period is equal to or shorter than the conduction upper limit time, will be described in detail with reference to FIGS.

Figure 9:
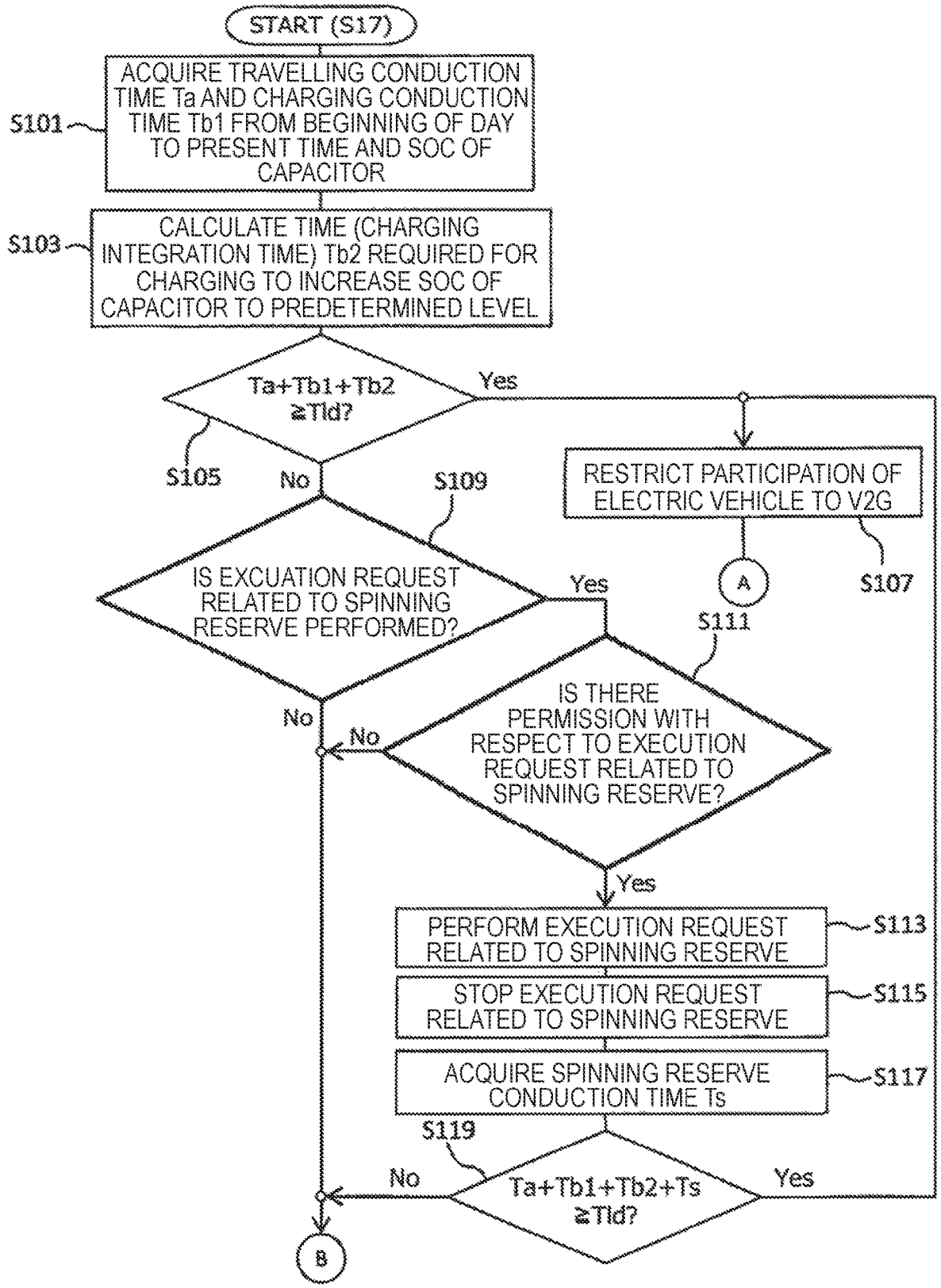
FIG. 9 is a flowchart illustrating a subroutine of Step S17 illustrated in the flowchart of FIG. 4.
Figure 10:
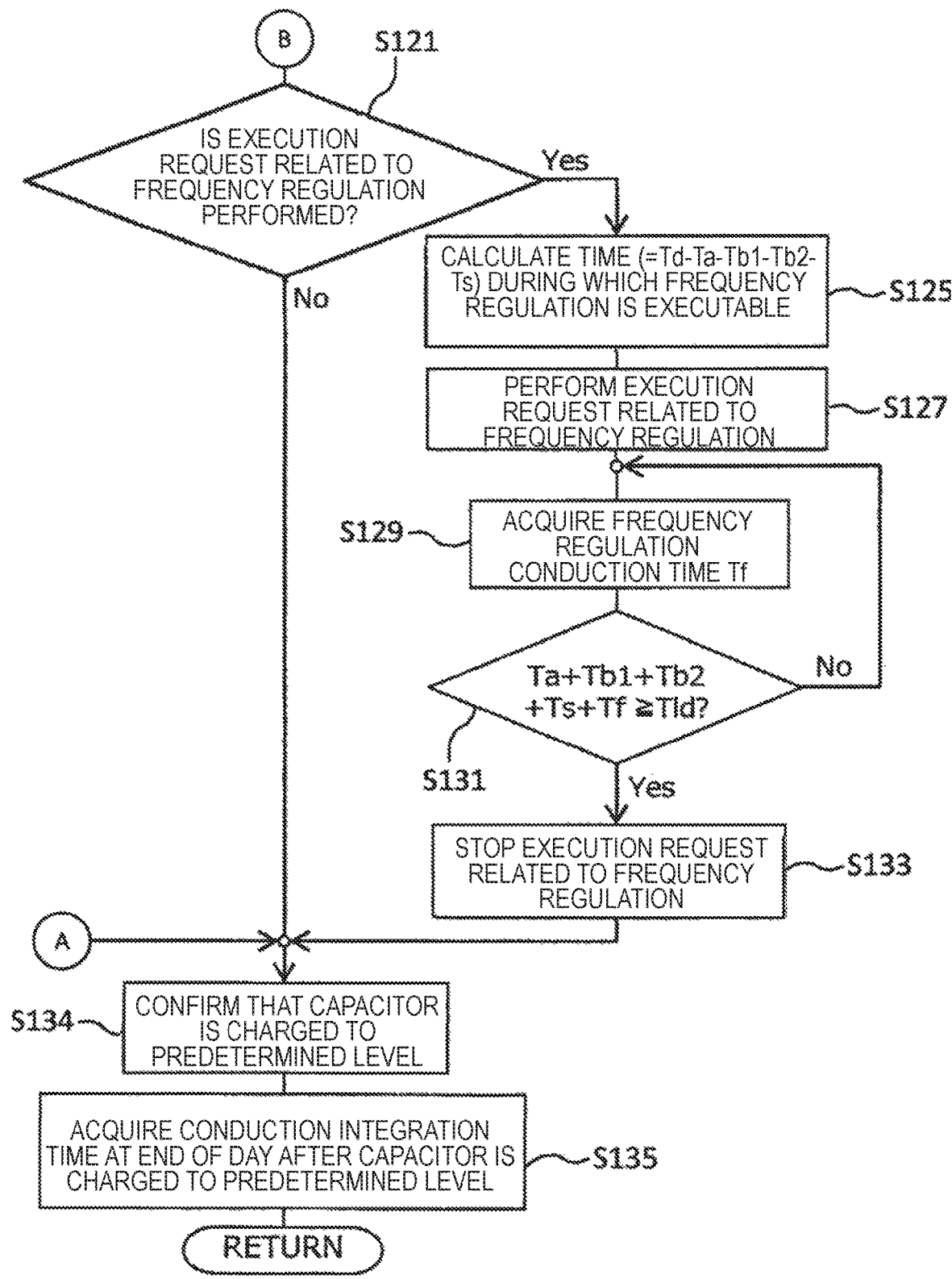
FIG. 10 is a flowchart illustrating a subroutine of Step S17 illustrated in the flowchart of FIG. 4.

9 and 10, in flowcharts illustrated in FIGS. 9 and 10, a case where the predetermined unit period is one day is illustrated.

As illustrated in FIG. 9, the aggregator 17 acquires the travelling conduction time Ta and the charging conduction time Tb1 from the beginning of the day (for example, 7 am) to the present time and the SOC of the energy storage device 114 at the present time from the electric vehicle 14 (Step S101). Next, the aggregator 17 calculates a time (charging conduction time) Tb2 required for charging to raise the SOC of the energy storage device 114 at the present time to a predetermined level (for example, SOC 100%) (Step S103). Next, the aggregator 17 determines whether the time obtained by adding the travelling conduction time Ta, the charging conduction time Tb1, and the charging conduction time Tb2 is equal to or longer than the conduction upper limit time Tld per day (Ta+Tb1+Tb2≥Tld) (Step S105) and, when "Ta+Tb1+Tb2≥Tld" is satisfied, the process proceeds to Step S107 and, when Ta+Tb1+Tb2<Tld is satisfied, the process proceeds to Step S109.

In Step S107, the aggregator 17 restricts the participation of the electric vehicle 14 to the V2G. That is, the aggregator 17 does not perform an execution request related to the V2G on the electric vehicle 14. After Step S107, the process proceeds to Step S134 illustrated in FIG. 10. In Step S109, the aggregator 17 determines whether or not to perform the execution request of the continuous discharging for providing the spinning reserve related to the V2G on the electric vehicle 14 and, when the execution request is performed, the process proceeds to Step S111 and, when the execution request is not performed, the process proceeds to Step S121 illustrated in FIG. 10.

In Step S111, the aggregator 17 communicates with the mobile communication terminal 19 possessed by the administrator of the electric vehicle 14 and it is determined whether continuous discharging for spinning reserve is permitted or not. Then, when it is permitted, the process proceeds to Step S113 and, when it is not permitted, the process proceeds to Step S121. In Step S113, the aggregator 17 performs an execution request related to the spinning reserve described above on the electric vehicle 14 and stops the execution request in Step S115. Next, the aggregator 17 acquires the conduction time (spinning reserve conduction time) Ts of the electric device due to the continuous discharge for the electric vehicle 14 to provide the spinning reserve (Step S117). Next, the aggregator 17 determines whether the value obtained by adding the travelling conduction time Ta, the charging conduction time Tb1, and the charging conduction time Tb2 obtained earlier and the spinning reserve conduction time Ts acquired in Step S117 is equal to or longer than the conduction upper limit time Tld per day (Ta+Tb1+Tb2+Ts≥Tld) (Step S119) and, when "Ta+Tb1+Tb2+Ts≥Tld" is satisfied, the process proceeds to Step S107 and, when "Ta+Tb1+Tb2+Ts<Tld" is satisfied, the process proceeds to Step S121.

In Step S121 illustrated in FIG. 10, the aggregator 17 determines whether or not to perform the short-term charging and discharging execution request for carrying out frequency regulation related to the V2G on the electric vehicle 14 and, when the execution request is performed, the process proceeds to Step S125 and, when the execution request is not performed, the process proceeds to Step S134.

In Step S125, the aggregator 17 calculates a time (=Td−Ta−Tb1−Ts) during which the electric vehicle 14 can perform charging and discharging for frequency regulation. Next, the aggregator 17 performs an execution request related to the frequency regulation on the electric vehicle 14 (Step S127) and acquires a conduction time (frequency regulation conduction time) Tf of the electric device due to charging and discharging by the electric vehicle 14 for frequency regulation (Step S129). Next, the aggregator 17 determines whether the value obtained by adding the travelling conduction time Ta, the charging conduction time Tb1, the charging conduction time Tb2, and spinning reserve conduction time Ts obtained earlier and the frequency regulation conduction time Tf acquired in Step S129 is equal to or longer Than e conduction upper limit time Tld per day (Ta+Tb1+Tb2+Ts+Tf≥Tld) (Step S131) and, when "Ta+Tb1+Tb2+Ts+Tf≥Tld" is satisfied, the process proceeds to Step S133 and, when "Ta+Tb1+Tb2+Ts+Tf<Tld" is satisfied, the process returns to Step S129. In Step S133, the aggregator 17 stops the execution request related to the frequency regulation.

In Step S134, the aggregator 17 confirms that, in the electric vehicle 14, the SOC of the energy storage device 114 is charged to a predetermined level. Next, in Step S135, the aggregator 17 acquires the conduction integration time, that is, the conduction integration time at the end of the day (for example, just before 7 am), after the SOC of the energy storage device 114 is charged to the predetermined level in the electric vehicle 14, and then the subroutine is finished. The charging for raising the SOC of the energy storage device 114 to a predetermined level is planned so that the ECU 117 of the electric vehicle 14 ends the charging before the start of the above-mentioned day.

Next, a method of setting the conduction upper limit time Tld per day by the aggregator 17 will be described with reference to FIG. 11.

Figure 11:
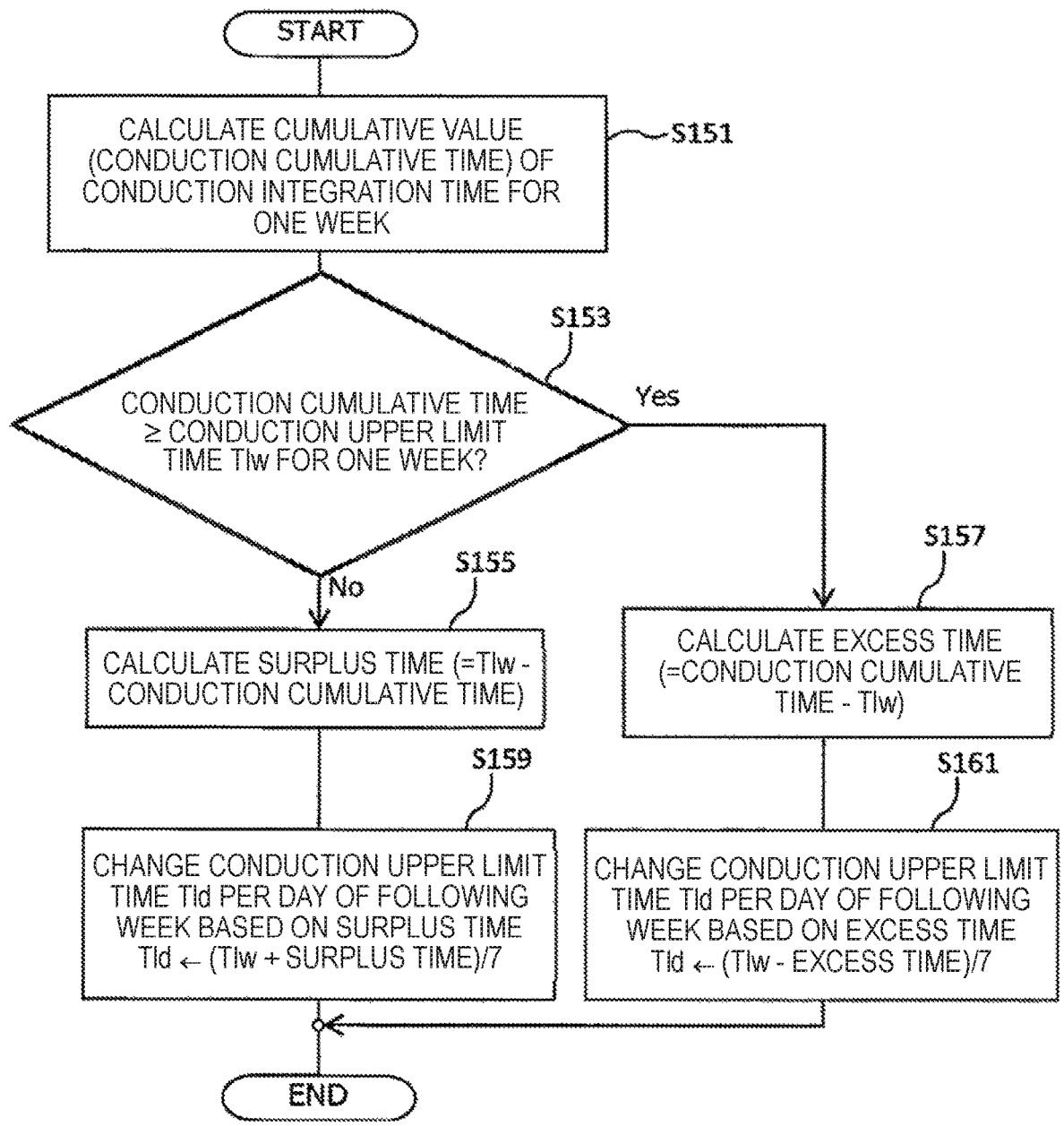
FIG. 11 is a flowchart illustrating a method of setting a conduction upper limit time per day by the aggregator.

As shown in FIG. 11, the aggregator 17 calculates a cumulative value (hereinafter, referred to as an "conduction cumulative time") of the conduction integration time of a specific period (one week in the example of FIG. 11) such as one week, one month, one year, or the like (Step S151). The beginning of the day is set at Midnight, the beginning of the week is set at midnight on Monday, the beginning of the month is set at midnight on the first day of the month, and the beginning of the year is set at midnight on January first. Next, the aggregator 17 determines whether the conduction cumulative time is equal to or longer than the conduction upper limit time (Tlw illustrated in the above table) of the electric device per week (conduction cumulative time≥Tlw) (Step S153). When conduction cumulative time<Tlw is satisfied, the process proceeds to Step S155 and, when "conduction cumulative time≥Tlw" is satisfied, the process proceeds to Step S157.

In Step S155, the aggregator 17 calculates a surplus time obtained by subtracting the conduction cumulative time from the conduction upper limit time Tlw, and then the process proceeds to Step S159. In Step S159, the aggregator 17 changes the conduction upper limit time Tld per day of a succeeding week based on the surplus time. That is, the aggregator 17 sets a value obtained by dividing a value obtained by adding the surplus time to a current conduction upper limit time Tlw by seven to a conduction upper limit time Tld per day of the succeeding week.

In Step S157, the aggregator 17 calculates excess time obtained by subtracting the conduction upper limit time Tlw from the conduction cumulative time, and then the process proceeds to Step S161. In Step S161, the aggregator 17 changes the conduction upper limit time Tld per day of the succeeding week based on the excess time. That is, the aggregator 17 sets a value obtained by dividing a value obtained by subtracting the excess time from the current conduction upper limit time Tlw by seven to the conduction upper limit time Tld per day of the succeeding week.

As described above, according to the embodiment, when the conduction integration time Tt of the electric device of the electric vehicle 14 which is measured from a start point of the warranty period of the electric vehicle 14 is equal to or longer than the conduction upper limit time Tl, only charging for raising the SOC of the energy storage device 114 to a predetermined level required for travelling of the electric vehicle 14 is performed in between charging and discharging of the energy storage device 114 by electric power transfer with the external power grid 11. After the conduction integration time Tt measured from the start point of the warranty period exceeds the conduction upper limit time Tl, travelling of the electric vehicle 14 can be performed by performing only charging of the energy storage device 114 without performing electric power transfer between the electric vehicle 14 and the external power grid 11 in a state where the durability of the electric device is degraded.

Also, when the conduction integration time of the electric device for a predetermined unit period such as one year, one month, one week, one day, or the like, is equal to or longer than the conduction upper limit time, participation in the electric power transfer with the power grid 11 in response to the external request is restricted. The conduction upper limit time which is to be compared with the conduction integration time of the electric device in a predetermined unit period is set based on the durability of the electric device and, when the conduction integration time is frequently equal to or longer than the conduction upper limit time, a timing at which the electric device cannot be used becomes earlier. When the electric device cannot be used, the electric vehicle 14 cannot run. Therefore, when the conduction integration time is equal to or longer than the conduction upper limit time, at least by performing charging of the energy storage device 114 for travelling, it is possible to reliably carry out travelling as the intended original purpose of the electric vehicle 14. When the conduction integration time does not exceed the conduction upper limit time, charging and discharging of the energy storage device 114 due to the electric power transfer related to the V2G can be performed without restriction. Therefore, it is possible to participate in the electric power transfer related to the V2G in accordance with the situation while giving priority to travelling of the electric vehicle 14.

Further, since the value obtained by adding the conduction time during travelling, the conduction time at the time of charging the energy storage device 114, and the conduction time at the time of charging and discharging according to the external request is set to the conduction integration time of the electric device, the conduction integration time which is to be compared with the conduction upper limit time can be accurately obtained.

In addition, the conduction upper limit time can be set according to the change of the situation in each predetermined unit period by modifying the conduction upper limit time based on a difference between the conduction integration time of the predetermined unit time and the conduction upper limit time. That is, when the conduction integration time of the predetermined unit time is shorter than the conduction upper limit time, it is possible to approximate the average value of conduction time over a plurality of predetermined unit periods to the conduction upper limit time of the initial predetermined unit period by setting a value obtained by adding a value based on the difference between the conduction integration time and the conduction upper limit time and an upper limit value of the conduction time in a predetermined unit period to the conduction upper limit time. On the other hand, when the conduction integration time of the predetermined unit period is longer than the conduction upper limit time, it is possible to approximate an average value of the conduction time over a plurality of predetermined unit periods to the conduction upper limit time of the initial predetermined unit period by setting a value obtained by subtracting a value based on the difference between the conduction integration time and the conduction upper limit time from an upper limit value of the conduction time in a predetermined unit period to the conduction upper limit time Whether or not to participate in the electric power transfer related to the V2G is determined by the intention of the administrator of the electric vehicle 14, so that the administrator can select the usability of the electric vehicle 14. In addition, since a notification of urging decision to participate or not in the electric power transfer related to the V2G is sent to the mobile communication terminal, it is possible to select participation in the electric power transfer of the electric vehicle 14 according to the intention of the administrator.

Further, the aggregator 17 collectively manages charging and discharging management of the energy storage device 114 based on the conduction time of the electric device of the electric vehicle 14, and thus the entire V2G system including the electric vehicle 14 and the aggregator 17 can be operated efficiently.

Second Embodiment

In a second embodiment, a case where no upper limit is set for the conduction integration time per day of the electric vehicle 14 will be described. The configuration of the second embodiment is the same as that of the V2G system described in the first embodiment.

In the second embodiment, the aggregator 17 adjusts the time (V2G time) during which the electric vehicle can participate in the V2G in order to guarantee the use of a vehicle during the warranty period for an electric vehicle with high travelling and charging frequencies.

Figure 12:
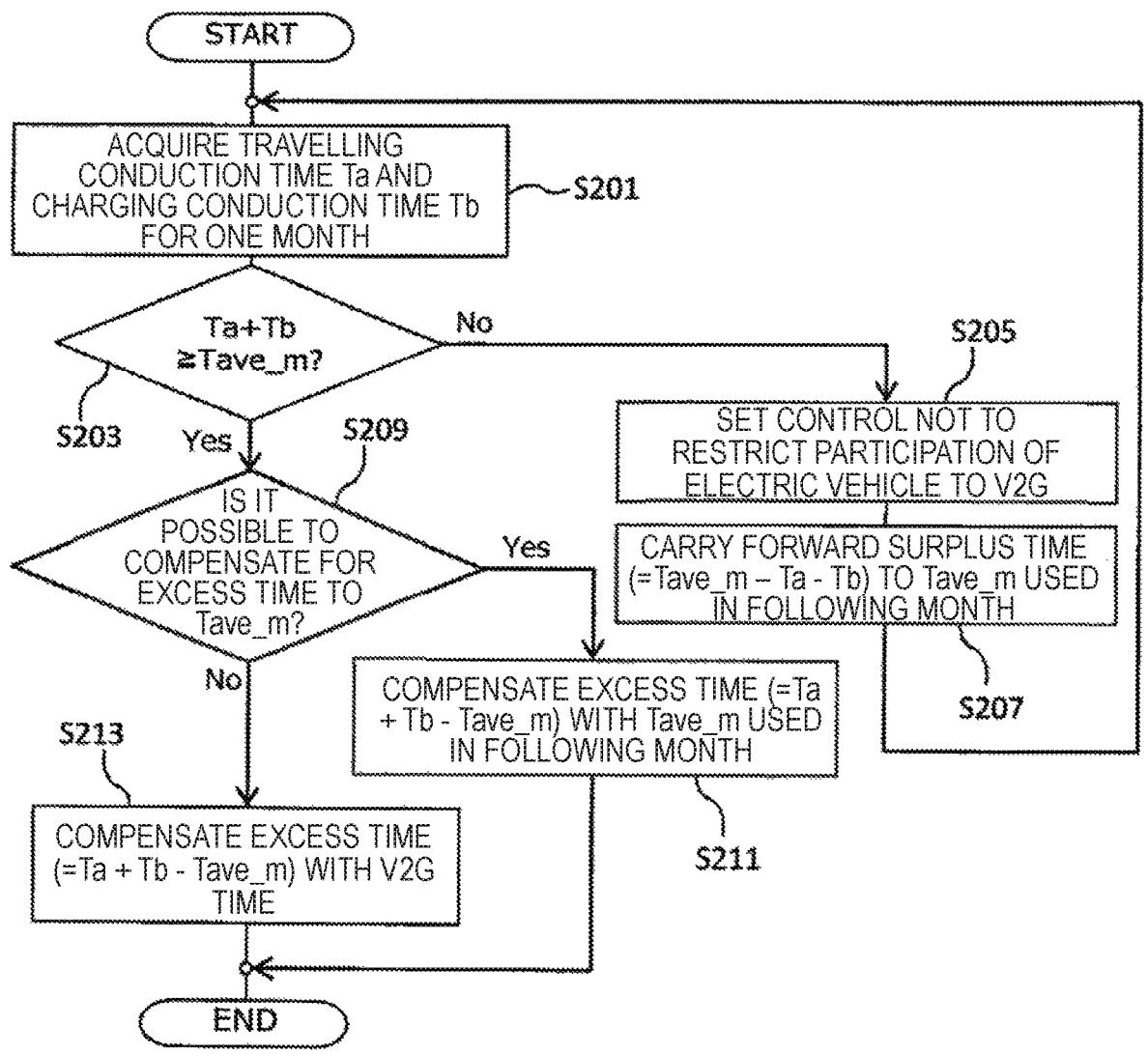
FIG. 12 is a flowchart illustrating a procedure of adjustment of a reference time or a V2G time according to an integration time of travelling and charging of the electric vehicle in a specific period.

FIG. 12 is a flowchart illustrating a procedure of adjustment of a reference time or a V2G time according to an integration time of travelling and charging of the electric vehicle in a specific period. As illustrated in FIG. 12, the aggregator 17 acquires the travelling conduction time Ta and the charging conduction time Tb for one month of the electric vehicle 14 (Step S201). Next, the aggregator 17 compares a time obtained by adding the travelling conduction time Ta and the charging conduction time Tb for one month with an averaging time (hereinafter, referred to as an "average time") Tave_m on a monthly basis in which currents are applied to the electric device of the electric vehicle 14 for travelling and charging based on the warranty period and the guaranteed mileage of the electric vehicle 14 or the like, and then the aggregator 17 determines whether "Ta+Tb≥Tave_m" is satisfied (Step S203). In Step S203, when it is determined that "Ta+Tb<Tave_m" is satisfied, the process proceeds to Step S205 and, when it is determined that "Ta+Tb≥Tave_m" is satisfied, the process proceeds to Step S209.

In Step S205, the aggregator 17 sets the control not to restrict the participation of the electric vehicle 14 to the V2G. Next, the aggregator 17 carries forward the surplus time (=Tave_m−Ta−Tb) to an average time Tave_m which is compared with a total value of the travelling conduction time Ta and the charging conduction time Tb of the following month (Step S207).

In Step S209, the aggregator 17 determines whether compensation for the excess time (=Ta+Tb−Tave_m) to the average time Tave_m is possible and, when it is possible, the process proceeds to Step S211 and, when it is not possible, the process proceeds to Step S213. In Step S211, the aggregator 17 compensates the above-mentioned excess time by the average time Tave_m to be compared with the total value of the travelling conduction time Ta and the charging conduction time Tb of the following month, in Step S213, the aggregator 17 compensates for the excess time with the V2G time.

As described above, according to the present embodiment, the V2G time is adjusted according to the integration time of travelling and charging of the electric vehicle 14 during a specific period, and thus it is also possible to transfer an electric power relating to the V2G between the electric vehicle 14 and the external power grid 11 according to the situation while giving priority to travelling of the electric vehicle 14.

The invention is not limited to the embodiments described above and may be appropriately modified, improved, and the like. For example, in the embodiments described above, a case where the aggregator 17 performs the processes illustrated in the flowcharts of FIG. 4 and FIGS. 9 to 12 is described, but those processes may be performed by the ECU 117 of the electric vehicle 14. In this case, each vehicle performs charging and discharging management of the energy storage device 114 based on the conduction time of the electric device of the vehicle, so that the processes in a case where there are a plurality of vehicles can be distributedly performed. The execution request related to the frequency regulation or the spinning reserve of the V2G follows the request from the aggregator 17.

What is claimed is:

1. A charge and discharge management device for managing charging and discharging of an energy storage device in a vehicle, the vehicle including: the energy storage device configured to perform electric power transfer with an external power grid; and an electric device configured to adjust an electric power to be charged and discharged by the energy storage device, and configured to travel by power supply from the energy storage device, wherein
    the charge and discharge management device is configured to charge the energy storage device, by the electric power transfer with the external power grid, for increasing a remaining capacity of the energy storage device to a predetermined level when a conduction integration time of the electric device measured from a start point of a warranty period of the vehicle is equal to or longer than a first predetermined time.

2. The charge and discharge management device according to claim 1, wherein
    when a conduction integration time of the electric device in a predetermined unit period is equal to or longer than a second predetermined time, the charge and discharge management device restricts the vehicle from participation in a system corresponding to the electric power transfer with the external power grid in response to an external request.

3. The charge and discharge management device according to claim 2, wherein
    a conduction integration time of the electric device is a value of adding a conduction time of the electric device during travelling of the vehicle, a conduction time of the electric device at the time of charging the energy storage device to raise a remaining capacity of the energy storage device to the predetermined level, and a conduction time of the electric device when the energy storage device is charged and discharged to and from the power grid in response to an external request.

4. The charge and discharge management device according to claim 3, wherein
    the charge and discharge management device calculates a difference between a conduction integration time of the electric device in the predetermined unit period and the second predetermined time, and modifies the second predetermined time based on the difference.

5. The charge and discharge management device according to claim 4, wherein
    the second predetermined time is an upper limit value of a conduction time of the electric device in the predetermined unit period based on the first predetermined time, and
    when a conduction integration time of the electric device in the predetermined unit period is shorter than the second predetermined time, the charge and discharge management device sets a value obtained by adding a value based on the difference to the upper limit value as the second predetermined time.

6. The charge and discharge management device according to claim 4, wherein
    the second predetermined time is an upper limit value of a conduction time of the electric device in the predetermined unit period based on the first predetermined time, and
    when a conduction integration time of the electric device in the predetermined unit period is longer than the second predetermined time, the charge and discharge management device sets a value obtained by subtracting a value based on the difference from the upper limit value as the second predetermined time.

7. The charge and discharge management device according to claim 1, wherein
    the vehicle participates in a system corresponding to the electric power transfer with the external power grid in response to an external request.

8. The charge and discharge management device according to claim 1, wherein
    when a conduction integration time of the electric device in the predetermined unit period is shorter than the second predetermined time, the charge and discharge management device sends a notification of urging decision, on whether the vehicle participates in a system corresponding to the electric power transfer with the external power grid in response to an external request, to a mobile communication terminal possessed by an administrator of the vehicle.

9. The charge and discharge management device according to claim 1, wherein
    the charge and discharge management device is provided in a server device controlling charging and discharging of the energy storage device of the vehicle according to an electric power request from an electric power system.

10. The charge and discharge management device according to claim 1, wherein
    the charge and discharge management device is provided in the vehicle.

* * * * *